United States Patent [19]

Costanza et al.

[11] 4,414,250

[45] Nov. 8, 1983

[54] AMINE CONTAINING RESIN WITH OXALATE ESTERS FOR CASTING

[75] Inventors: John R. Costanza, North Plainfield; Louis E. Trapasso, Watchung, both of N.J.

[73] Assignee: Celanese Corporation, New York, N.Y.

[21] Appl. No.: 308,064

[22] Filed: Oct. 2, 1981

[51] Int. Cl.³ .............................................. B05D 3/02
[52] U.S. Cl. .................... 427/386; 427/385.5; 427/388.2; 427/388.3; 525/386; 525/486; 525/491; 560/190
[58] Field of Search ............... 525/386, 773, 486, 491; 560/190; 156/242, 326, 330, 330.9, 331.2, 331.6, 331.7, 331.8, 332, 331.3; 52/390; 427/386, 385.5, 393, 388.2, 388.3; 264/299

[56] References Cited

U.S. PATENT DOCUMENTS

| | | | |
|---|---|---|---|
| 3,383,434 | 5/1968 | Carlston | 528/113 X |
| 3,639,344 | 2/1972 | Kinneman, Jr. et al. | 525/486 X |
| 3,821,125 | 6/1974 | Saegusa et al. | 162/135 X |
| 3,825,598 | 7/1974 | Eifler et al. | 422/198 X |
| 3,845,010 | 10/1974 | Labana et al. | 525/386 X |
| 4,020,123 | 4/1977 | Trapasso | 528/113 X |
| 4,123,402 | 10/1978 | Thomassen | 523/420 X |
| 4,220,578 | 9/1980 | Kho et al. | 524/773 |
| 4,302,561 | 11/1981 | Becher et al. | 525/386 X |

*Primary Examiner*—Thurman K. Page
*Attorney, Agent, or Firm*—Depaoli & O'Brien

[57] ABSTRACT

Thermosetting resin coatings are provided which cure rapidly and exothermically at ambient temperatures. Accelerated crosslinking is accomplished by the reaction of oxalic acid esters with amine-containing polymeric compositions.

13 Claims, No Drawings

AMINE CONTAINING RESIN WITH OXALATE ESTERS FOR CASTING

BACKGROUND OF THE INVENTION

It has become increasingly important in resin coating applications that curing of resin systems be accomplished at ambient temperatures and with little or no formation of volatile material.

Resilient seamless flooring is a recent innovation, having been developed during the last decade. A basic seamless floor is composed of a single continuous layer or coat of thermosetting plastic which is firmly bonded to a desired substrate. Seamless chip flooring is a relatively new concept in resilient seamless flooring and involves the on-site encasement of decorative chips in a clear, liquid plastic matrix.

The total number of coats and the thickness of each coat of thermosetting plastic applied to any given substrate depend in part upon the nature of the substrate, the composition of the thermosetting plastic, the method of application, and the properties or characteristics desired in the finished floor. Generally, any resilient seamless floor is comprised of a base coat and optionally one or more finish coats. A seamless chip floor usually consists of a base coat, an optional chip coat, decorative chips, one or more glaze coats, and one or more finish coats.

Because the color and pattern of a seamless floor are determined by the base coat and decorative chips, if used, the glaze and finish coats are clear. Obviously, any discoloration of the base coat resin will alter the color of the floor, especially with lightly-colored floors. Discoloration of the glaze and/or finish coats not only will alter the color of the floor, but also will mask the effect of decorative chips, if employed. Thus it is imperative that the resins employed for the base, glaze, and finish coats be free from discoloration from any cause, either before or during curing. Freedom from discoloration also is important when glaze coat resins are applied to walls and other surfaces as protective coatings.

Epoxy resins are among the materials which have been employed successfully as base coats and glaze coats, particularly the epoxy resins based on glycidyl ethers. Such resins, when cured with aliphatic amines, possess an outstanding number of advantages such as excellent adhesion to concrete, plywood, brick, ceramic tile, and plastic tile, resistance to bleedthrough, moisture resistance, low odor, flexibility (resilience), and low temperature curability.

Although listed above as an advantage of glycidyl ethers cured with aliphatic amines, low temperature curability in reality is a requirement of any resin intended for use in seamless flooring. This requirement stems from the rather obvious fact that it is wholly impractical to heat the resin onceapplied to the substrate. Thus any applied resin must cure at ambient temperature, which may be as low as about 40 degrees Fahrenheit.

In general, glycidyl ethers may be cured at ambient temperature by aliphatic amines. The lower the ambient temperature, however, the longer is the time required to cure the resin. It therefore is desirable to utilize an accelerator to keep cure times within reasonable limits.

Various classes of compounds are known to be accelerators for aliphatic amine/glycidyl ether systems. All, however, suffer disadvantages. For example, as a consequence of very pronounced temperature dependence, aliphatic and aromatic organic acids and aliphatic tertiary amines result in a short working life (pot life) and a very long film cure time. Aliphatic and aromatic mercaptans impart excessive and usually intolerable odor to the resin system. And sulfonamides and phenols discolor the resin system. The discoloration by phenols, the most commonly used accelerator class, is most pronounced with phenol itself, with less color being developed with such substituted phenols as nonylphenol. Hence, there is a need for novel accelerators and crosslinking agents for amine-curable epoxy resins.

Other resin coating systems which are of interest and which are being actively investigated are low viscosity thermoplastic compositions which are easily sprayed or cast onto substrates and which cure at ambient temperatures to highly crosslinked thermoset coatings substantially without evolution of volitile component. Essentially 100% of the low viscosity resin coating system is incorporated in the resultant thermoset coating.

It is therefore an object of the present invention to provide novel low temperature curable thermoplastic resin compositions which convert to highly crosslinked coating systems substantially without evolution of volitile material.

It is another object of the present invention to provide curable compositions derived from amine-containing resin compositions.

It is still another object of the present invention to provide novel accelerators and crosslinking agents for amine-modified epoxy resins, and for polyamino-polyaryl-polymethylene resins.

DESCRIPTION OF THE INVENTION

One or more objects of the present invention are accomplished by a method which comprises incorporating an oxalate ester into an amine-containing thermoplastic resin composition.

The oxalate ester is selected from those corresponding to the formula:

$$RO_2C-CO_2R$$

wherein R is an aliphatic radical containing between one and about ten carbon atoms. Preferably, R is a lower alkyl group containing between one and about four carbon atoms.

By the term "amine-containing thermoplastic resin composition" is meant a composition wherein the polymer molecules contain a plurality of primary or secondary amino groups (i.e., those containing amino-hydrogen atoms).

It has been found that oxalate esters react rapidly and exothermically with primary and secondary amino groups with the formation of oxamide crosslinkages between amine-containing polymeric chains.

The proportion of oxalate ester incorporated into a amine-containing thermoplastic resin composition primarily is a function of the curing performance desired. It is apparent that the greater the number of amino groups present, and the greater the quantity of oxalate ester incorporated into the resin composition, the more crosslinked and thermoset is the final cured coating or film. Generally, a quantity of oxalate ester is employed to provide between about 0.2 and 1 carboxylate ester groups per amino-hydrogen moiety present in the resin composition. The desired properties of the cured resin composition as affected by the degree of crosslinking is a factor to be considered in determining the quantity of oxalate ester incorporated.

Other materials can be included in the curable resin compositions, such as asbestos, aluminum oxide, pigments, dyes, plasticizers, reactive diluents, and the like. Although not preferred, solvents such as aromatic hydrocarbons, ketones, alcohols, ethers, halocarbons, and the like, may be employed.

Among the curable compositions provided by the practice of the present invention are mixtures of oxalate ester and amine-modified thermoplastic epoxy resins. The preferred amine-modified thermoplastic epoxy resins are blends of glycidyl ethers and aliphatic amines.

Useful glycidyl ethers include glycidyl ethers of polyhydric phenols obtained by reacting a polyhydric phenol in an excess of epichlorohydrin with sodium hydroxide. Such polyhydric phenols include bisphenol A (2,2-bis 4-hydroxyphenylpropane), resorcinol, hydroquinone, 4,4-dihydroxybenzoyphenone, 1,2-bis(4-hydroxyphenyl)ethane, 1,5-dihydroxynaphthalene, 4,4'-dihydroxybiphenyl, and novolak resins containing more than two phenol moieties linked through methylene bridges.

Other glycidyl ethers of polyhydric phenols are polymers prepared by reacting from 1.1 up to about 2 moles of epichlorohydrin with 1 mole of dihydric phenol or by reacting diepoxides with addition dihydric phenol.

Still other glycidyl ethers are glycidyl ethers of polyhydric alcohols made by reacting a polyhydric alcohol and epichlorohydrin with an acidic catalyst such as boron trifluoride and subsequently treating the resulting product with an alkaline dehydrohalogenating agent. Included among the polyhydric alcohols that can be used in the preparation of these glycidyl ethers are glycerine, ethylene glycol, propylene glycol, polypropylene glycol, diethylene glycol, hexanetriol, pentaerythritol, trimethylolethane, trimethyolpropane, and trimethylolbutane.

The aliphatic amines useful in blending with glycidyl ethers are those which contain at least two amine nitrogen atoms and more than two active hydrogen atoms per molecule. Examples of such amines includes, among others, the alkylene polyamines, such as ethylenediamine, diethylenetriamine, triethylenetetramine, tetraethylenepentamine, iminobispropylamine, methyliminobispropylamine, hexamethylenediamine, poly(oxypropylene)diamine, and the like. Also included among the aliphatic amines are cyanoethylated and hydroxyalkylated aliphatic amines which can be prepared by reacting ammonia or such amines as the alkylene polyamines with acrylonitrile and monoepoxides, respectively; examples of suitable monoepoxides include ethylene oxide, propylene oxide, and monoglycidyl ethers and esters. Amine adducts formed by reacting epoxy resins with an excess of an aliphatic polyamine also are useful in the present invention.

This invention also contemplates the incorporation of oxalate ester into thermoplastic composition comprising aminoplast resins, or aminoplast resins blended with epoxy resins. For example, an oxalate ester is incorporated into a thermoplastic resin blend of a low molecular weight epoxy resin and aminoplast resin in combination with a polycarboxylic acid. The components can be dissolved in a solvent, and then sprayed or cast on a substrate. Polymerization and curing occurs after formation of the film. The reactions which transform the thermoplastic film into a thermoplastic coating are (1) The reaction of a carboxylic acid group and an epoxide group with the formation of an ester group and a hydroxyl group, (2) the reaction of hydroxyl group and aminoplast resin, and (3) the reaction of oxalate groups and amino-hydrogen groups resulting in a crosslinked structure.

The aminoplast condensates to be employed in this embodiment are urea-aldehyde and triazine-aldehyde resins and alcohol modified derivatives thereof, that is alkylated amino resins wherein the alkyl radical contains from 1 to 8 carbon atoms. Such aminoplast resins are the reaction products of aldehydes, for instance formaldehyde, acetaldehyde and the like, with urea, substituted ureas, thioureas, ethylene urea, dicyandiamide, melamine, benzoguanamine, acetoguanamine and the like. The resulting methylol substituted products are etherfied with alcohols, for example isopropanol, butanol and 2-ethylhexanol, in order to obtain stability and organic solubility. Such organic soluble aminoplast resins are contemplated for use in this invention.

A particularly interesting aspect of the present invention is the oxalate ester crosslinking of thermoplastic resins which have a large number of recurring amino groups in the backbone of polymer chains. One such thermoplastic resin, for example, is polyethylemine. This resin is prepared by polymerizing ethylenimine in the presence of various cationic catalysts. Both linear and branched structures can be produced. Polyethyleneimine can also be obtained by hydrolysis of the polymerization product of 2-methyl-2-oxazaline, or by hydrolysis of poly(N-formyl ethyleneimine) as described in U.S. Pat. No. 3,821,125.

Another important category of thermoplastic resins which are applicable in the practice of the present invention are those which contain recurring anhydride groups. Such resins are first treated with an aliphatic polyamine to append a plurality of amine groups to the polymer molecules by reaction of an amine group with an anhydride group. For example, hexamethylenediamine would react to form an amide linkage with one of its amine groups, while the other amine group would remain unreacted for a period of time. Oxalate ester is blended with the amine-modified thermoplastic resin, and rapid crosslinking occurs by reaction of the oxalate ester and the pendant amino groups.

The polyanhydride resins which can be amine-modified are any of the thermoplastic resins which are produced by copolymerization of olefinically unsaturated monomers with olefinically unsaturated anhydrides. For example, resins produced by copolymerization of a monomer such as ethylene propylene, butadiene, acrylonitrile, ethyl acrylate, vinyl chloride, styrene, vinyl ether, vinyl acetate, cyclopentadiene, cyclohexene and vinylcyclohexene with an anhydride (or its corresponding carboxylic acid derivative) such as maleic anhydride, itaconic anhydride and tetrahydrophthalic anhydride.

Another important category of polyamines which are adapted for crosslinking in accordance with the present invention are the polyamine-polyaryl-polymethylene type obtained by condensing aromatic amines with aldehydes or aldehyde precursors. These polyamines are prepared by condensing an aromatic amine with aldehyde in a molar ratio of from about 15:1 to about 2:4, employing a quantity of an acidic catalyst corresponding to a molar ratio of amine to catalyst of from about 10:1 to about 1:1, and subsequently working up the reaction mixture under alkaline conditions, wherein of a portion of the initially prepared amine/catalyst mixture is cooled to a temperature below about 40° C., is allowed to react with the aldehyde while cooling in a reactor in which a temperature of about 60° C. is not exceeded, and is thereafter introduced into a reactor heated to at least about 75° C. into which the uncooled portion of the amine/catalyst mixture is simultaneously introduced.

The following examples are further illustrative of the present invention. The reactants and other specific ingredients are presented as being typical, and various modifications can be devised in view of the foregoing disclosure within the scope of the invention.

EXAMPLE 1

Oxalate Ester Crosslinking Of An Amine-Curable Epoxy Resin

One hundred grams of EPI-REZ 510, the diglycidyl ether of Bisphenol A having an epoxide equivalent weight of 180–200 (Celanese Coatings Company, Louisville, Kentucky) and 26 grams of Jeffamine D-230 are blended to form a homogeneous mixture, and heated at a temperature of 60° C. for one hour.

Five grams of dimethyl oxalate is incorporated into the resin blend, and a 100 ml film is cast on a wood substrate. Within two hours the film is cured to a hard glossy coating having properties characteristic of thermoset epoxy resins.

EXAMPLE 2

Oxalate Ester Crosslinking Of Polyethyleneimine

Twelve grams of polyethyleneimine (M.W. 1200) and 0.72 grams of diethyl oxalate are mixed together, and within seconds the mixture is cast on a steel substrate. In less than five minutes, the coating is firm and glossy.

The procedure with repeated employing 24 grams of polyethyleneimine and 2.0 grams of dibutyl oxalate. When the mixture is cast on a steel substrate, a glossy flexible coating is obtained within several minutes at ambient temperature.

EXAMPLE 3

Oxalate Ester Crosslinking Of Polyamine Of Polyamino-polyaryl-polymethylene Type In a procedure similar to that described in U.S. Pat. No. 3,825,598, a polyamine condensate is prepared by reaction of aniline with 30% aqueous formalin in the presence of 30% aqueous hydrochloric acid catalyst.

In a similar manner, a polyamine condensate is produced by reaction of p-chloroaniline with acetaldehyde.

One hundred grams of aniline/formaldehyde condensate and 10 grams of dimethyl oxalate are mixed with 75 ml. of methylene chloride. A second solution is prepared with p-chloroaniline/acetaldehyde as the polyamine condensate.

Coatings are cast on steel substrates, and within several minutes glossy films are formed at ambient temperature. Drying the coated steel substrates in an oven at 60° C. overnight converts the films into strongly adherent, thermoset resinous coatings.

What is claimed is:

1. A coating composition curable at ambient temperatures comprising a mixture of a thermoplastic resin containing a plurality of primary or secondary amino groups, and an oxalate ester corresponding to the formula:

$$RO_2C\text{—}CO_2R$$

wherein R is a lower alkyl group containing between one and about four carbon atoms.

2. A coating composition curable at ambient temperatures comprising a mixture of a thermoplastic resin containing a plurality of primary or secondary amino groups, and an oxalate ester corresponding to the formula:

$$RO_2C\text{—}CO_2R$$

wherein R is a lower alkyl group containing between one and about four carbon atoms.

3. A crosslinked resin composition which is a resultant product of a process in accordance with claim 2.

4. A method for protecting a surface with a crosslinked resinous coating which comprises admixing an oxalate ester with polyethyleneimine polyamine and casting the admixture on said surface at ambient temperatures; said oxalate ester corresponding to the formula:

$$RO_2C\text{—}CO_2R$$

wherein R is a lower alkyl group containing between one and about four carbon atoms.

5. A method in accordance with claim 4 wherein the polyamine is instead an amine-modified thermoplastic epoxy resin.

6. A method in accordance with claim 4 wherein the polyamine is instead an aromatic amine-aldehyde condensate.

7. A method in accordance with claim 4 wherein the polyamine is instead an amine-modified polyanhydride.

8. A method in accordance with claim 4 wherein the polyamine is instead an aminoplast resin.

9. A low temperature curable composition comprising a mixture of an oxalate ester and polyethyleneimine; said oxalate ester corresponding to the formula:

$$RO_2C\text{—}CO_2R$$

wherein R is a lower alkyl group containing between one and about four carbon atoms.

10. A low temperature curable composition comprising a mixture of an oxalate ester and an amine-modified thermoplastic epoxy resin; said oxalate ester corresponding to the formula:

$$RO_2C\text{—}CO_2R$$

wherein R is a lower alkyl group containing between one and about four carbon atoms.

11. A low temperature curable composition comprising a mixture of an oxalate ester and an aromatic amine-aldehyde condensate; said oxalate ester corresponding to the formula:

$$RO_2C\text{—}CO_2R$$

wherein R is a lower alkyl group containing between one and about four carbon atoms.

12. A low temperature curable composition comprising a mixture of an oxalate ester and an amine-modified polyanhydride; said oxalate ester corresponding to the formula:

$$RO_2C\text{—}CO_2R$$

wherein R is a lower alkyl group containing between one and about four carbon atoms.

13. A low temperature curable composition comprising a mixture of an oxalate ester and an aminoplast resin; said oxalate ester corresponding to the formula:

$$RO_2C\text{—}CO_2R$$

wherein R is a lower alkyl group containing between one and about four carbon atoms.